US006585895B2

(12) United States Patent
Smith et al.

(10) Patent No.: US 6,585,895 B2
(45) Date of Patent: Jul. 1, 2003

(54) WASTEWATER TREATMENT PROCESS

(75) Inventors: Stephen A. Smith, Townville, SC (US); Howard E. C. Brown, Spartanburg, SC (US)

(73) Assignee: Rhodia Inc., Cranbury, NJ (US)

( * ) Notice: Subject to any disclaimer, the term of this patent is extended or adjusted under 35 U.S.C. 154(b) by 97 days.

(21) Appl. No.: 09/767,478

(22) Filed: Jan. 23, 2001

(65) Prior Publication Data

US 2002/0096472 A1 Jul. 25, 2002

(51) Int. Cl.$^7$ ................................................. C02F 3/12
(52) U.S. Cl. ...................... 210/606; 210/624; 210/625; 210/626
(58) Field of Search ................................ 210/606, 620, 210/624, 625, 626, 631, 632

(56) References Cited

U.S. PATENT DOCUMENTS

| | | | |
|---|---|---|---|
| 3,047,492 A | | 7/1962 | Gambrel |
| 3,264,213 A | * | 8/1966 | Pav et al. .................. 210/635 |
| 3,386,911 A | | 6/1968 | Albertson |
| 4,488,968 A | * | 12/1984 | Hong et al. .................. 210/625 |
| 4,705,633 A | | 11/1987 | Bogusch |
| 4,915,840 A | | 4/1990 | Rozich |
| 4,919,815 A | | 4/1990 | Copa et al. |
| 4,940,539 A | * | 7/1990 | Weber ......................... 210/632 |
| 5,019,267 A | | 5/1991 | Eberhard et al. |
| 5,078,882 A | | 1/1992 | Northrop |
| 5,254,253 A | | 10/1993 | Behmann |
| 5,288,405 A | | 2/1994 | Lamb, III |
| 5,356,537 A | * | 10/1994 | Thurmond et al. ......... 210/625 |
| 5,531,898 A | | 7/1996 | Wickham |
| 5,540,839 A | | 7/1996 | Pirt |
| 5,647,986 A | | 7/1997 | Nawathe et al. |
| 5,811,009 A | | 9/1998 | Kos |
| 5,958,241 A | | 9/1999 | DeBenedetto et al. |
| 5,976,375 A | | 11/1999 | Dorica et al. |
| 6,039,874 A | | 3/2000 | Teran et al. |
| 6,224,769 B1 | * | 5/2001 | Hasegawa et al. .......... 210/606 |

OTHER PUBLICATIONS

Eckenfelder "Principles of Water Quality Managemant" pp. 179,182, 467 and 469, 1980.*
Steel & McGhee "Water Supply and Sewerage" pp. 226,227, 230 and 237, 1979.*

* cited by examiner

*Primary Examiner*—Christopher Upton
(74) *Attorney, Agent, or Firm*—Alston & Bird LLP

(57) ABSTRACT

There is provided a process for treating industrial wastewater that substantially eliminates the generation of excess solids in the system requiring mechanical removal. The wastewater undergoes an equalization step wherein hydraulic flow is smoothed and the pH of the wastewater is adjusted to near neutral pH conditions. The equalized wastewater is then transferred to aeration tanks where the organic process wastes are absorbed, metabolized, or otherwise biodegraded by the microorganisms in the mixed liquor in the aeration tanks. After the aeration step, the wastewater is separated by gravity in a clarifying step to separate the wastewater into a liquid phase and a semi-solid phase. The clarified liquid phase is withdrawn from the clarifier and discharged, while the semi-solid phase is transferred either directly back to the aeration/biological treatment step, as recycle-activated sludge, or into a bioreactor as waste-activated sludge. In the bioreactor the semi-solid phase is subjected to active aeration. The aerated waste-activated sludge is then batch-recycled to the equalization tank discharging to the aeration step where it is mixed into newly introduced untreated wastewater and undergoes a new cycle of biological treatment. As a result of the indirect batch-recycling of bioreactor waste-activated sludge into the mixed liquor (biomass containing waste sludge) under aeration, which is also receiving recycle-activated sludge and enzymes, the excess solids generated in this process virtually eliminated.

10 Claims, 1 Drawing Sheet

WASTEWATER TREATMENT PROCESS

FIELD OF THE INVENTION

This invention relates to an improved process for the treatment of industrial wastewater. More specifically, the invention relates to an improved process for treating wastewater from industrial wastewater treatment plants using the biologically-activated sludge process in a manner that eliminates the need for any mechanical removal of excess solids, or the use of other conventional solids treatment units.

BACKGROUND OF THE INVENTION

The production of excess solids in conventional biologically-activated sludge wastewater treatment plants is accepted as a normal part of operations but it can be a substantial and expensive problem. For example, even a small industrial wastewater pretreatment plant that receives influent hydraulic loading at the rate of only 35,000 gallons per day from a surfactant manufacturing operation might need to dispose of 300–400 tons of excess solids per year. These relatively large amounts of excess solids must be disposed of properly and legally and most often this disposal is done in landfills.

The aerobic microbiological treatment of waste organic matter from sewage or industrial effluents often uses the conventional biologically-activated sludge process. As used herein the biologically-activated sludge process is sometimes referred to as "BAS". A major drawback of this conventional technology is that the metabolic process of the biomass, the function that degrades and destroys the organic wastes, also produces solids growth as a normal consequence of cellular processes. Each pound of "food" (in the form of dissolved or suspended organic solids) that is consumed (converted) by the BAS process in the biomass can produce up to half a pound, or more, of inactive solids. These solids are dead and/or dying organisms of the biomass that have completed their biological cycle and are no longer effective. The accumulation of the excess solids appears in treated, wasted sludge mechanically removed from the treatment system. The routine disposal of the wasted sludge by dumping on land or at sea has the potential for adverse environmental effects and landfilling the treated sludge is increasingly more expensive, or in some extreme cases banned.

The BAS process has been used for many years for the treatment of wastewater, particularly for high-strength wastes. The BAS process maintains control over the beneficial use of the suspended biological solids in the biomass under aeration. The metabolic activity rate is determined by the presence of both sufficient dissolved oxygen and food. Aerobic bacteria, the predominant component of the biomass, feed on the dissolved organic wastes. The aerobic bacteria grow, reproduce and eventually die. The metabolic processes use dissolved oxygen and organic wastes found in wastewater to provide the fuel for cellular metabolism.

A drawback of the BAS process is that the total solids under suspension in the aeration tanks continue to increase until all the usable food is consumed, at which point the system dies, or goes septic. The only widely accepted solution to the solids buildup problem in plants using conventional BAS processes is the continual or intermittent mechanical removal of the solids from the system in order to maintain stable, optimal conditions for cell growth in the aeration tanks.

These relationship behaviors between available food and the amount of living biomass can be predicted mathematically as food/biomass ratios, referred to as F/M ratios or alternatively, as mean cell residence time's (MCRT). Using these predictive behavioral indicators, wastewater operators can better control the BAS process and stabilize solids within an optimum range.

In a BAS process what remains of the untreated, dissolved solids in the finished water from the aeration tanks can usually be settled out by gravity (sometimes with the help of polymers) in a secondary clarifier as the sludge blanket. The portion of the sludge blanket which is not returned to the aeration step in the BAS process as return activated sludge is transferred as waste-activated sludge to a solids treatment process. "Treatment" or "shot" tanks are used for staging waste-activated sludge before it is sent to a mechanical water removal and/or drying unit. In these staging tanks, strong inorganic chemicals, ferric chloride and lime, dramatically lower the wastewater's pH and aid in the shearing of the filaments of activated sludge. Usually a small amount of a flocculation polymer is added to the treated sludge to facilitate the formation of particles of sheared sludge of the proper size and shape until the point at which optimal settling out occurs.

The clear water above the thickened, polymer treated sludge layer is decanted from the tops of these tanks and directly discharged or recycled. The thickened sludge layer left in the bottom of the treatment tanks is pumped to a mechanical dewatering device, usually a filter press, where water is mechanically squeezed out leaving the modified, dewatered sludge in the form of a filter cake. This filter cake is accumulated on site and then transported to a landfill.

In conventional BAS processes, the aerobic digestion process almost never goes to completion; that is, all of the food (including the excess solids, or sludge) is consumed. When biological processes achieve 100% completion, the only byproducts are $H_2O$, $CO_2$, and traces of inert ash. However, to digest (biotreat) a single pound of food in a conventional BAS process as much as 0.53 lbs. of dead/dying bugs can be created. Thus, the total amount of solids under aeration slowly increases and ratio of living to dead organisms in the biomass slowly decrease. Soon total solids are so concentrated in the aeration tanks that the aerobic process is greatly inhibited. Therefore, excess solids have to be mechanically removed at that point in order for effective bioactivity to resume.

Various processes have been proposed to minimize or eliminate excess sludge in conventional BAS wastewater treatment processes. One such wastewater treating process is set forth in U.S. Pat. No. 5,356,537 to Thurmond et al. The Thurmond process teaches a process for treating wastewater including mixing wastewater with activated sludge in an aeration tank followed by clarifying in a settling tank. From 5% to 25% of the activated sludge solids from the settling tank is returned to the aerobic digester. The activated sludge solids is held in the aerobic digester from about 16 to 24 hours and then the activated sludge is transferred from the aerobic digester to the aeration tank. This process must employ both multiple cycles as well as multiple treatment units to be effective in the removal of excess solids (sludge) from the system.

In U.S. Pat. No. 3,047,492 to Gambrel there is described a modified activated sludge type of sewage treatment that eliminates the sludge beds, anaerobic digesters and costly sludge handling equipment. The Gambrel invention is said to eliminate the production of sludge and produce a clear final effluent that can be safely discharged into a creek or stream. To eliminating sludge, the Gambrel process incorporates a separate stage wherein most of the sludge from the settling tanks and approximately 25% of the daily intake of the plant is returned to the aeration tanks of the system while approximately 3% thereof is diverted to an aerobic digester. In the aerobic digester the sludge is detained for approximately 10 to 15 days and completely digested to produce an inert invisible ash and clear liquid that is then returned to the system. Once again, multiple units, as well as longer multiple cycles, would be required for the effective reduction in total sludge discharged.

Thus, there remains an unfilled need for an improved, simplified BAS process for treating wastewater to eliminate excess sludge quickly, efficiently, economically and without the use of both multiple treatment units and multiple, time-consuming, extra cycles. This improved process should also be useful in the treatment of lower-strength wastewater in other sewage treatment plants that use the BAS process.

SUMMARY OF THE INVENTION

It is therefore a general object of the present invention to provide improvements to the conventional BAS process that eliminate excess solids from industrial wastewater without using any mechanical means for their removal.

In the process of this invention batch-recycling loops are added to the conventional serial or continuous flow BAS process. Using novel mechanisms, excess solids can be almost completely eliminated from the waste generated by the normal biological processes during the operation of this improved BAS process.

Industrial wastewater from a manufacturing plant is first screened to remove insoluble, mostly inorganic waste, trash and other larger pieces of untreatable debris. The wastewater flow is then measured. Before it is introduced into the wastewater treatment plant, the wastewater enters a properly sized, specialized tank which slows the water flow. This tank performs some of the functions of a clarifier. For example, it provides for the removal of insolubles, such as fats, oils, and greases.

In the process of this invention, the process wastewater first undergoes an equalization process that smoothes hydraulic flow. In the equalization tanks, the pH of the wastewater is continuously monitored and automatically adjusted to maintain near neutral conditions; that is, pH in the 6.8–7.2 range that avoids shocking the biomass in the next step. The equalized wastewater is then transferred to aeration tanks where the dissolved organic wastes (mostly high molecular weight solids) are absorbed, or metabolized, or converted by active biodegradation into smaller, simpler, easier to metabolize organic materials. Eventually, almost all of these are converted to $CO_2$, $H_2O$ and inert ash by the microorganisms in the biomass.

After the aeration step, the finished wastewater is transferred to a clarifier which uses gravity to separate the wastewater into two distinct phases; a liquid phase, and a semi-solid phase, or sludge, which settles to the bottom of the clarifier and forms a blanket. Small doses of polymers may be added to the clarifier to facilitate the agglomeration of sludge into this semi-solid waste state. The liquid phase may be discharged from the clarifier for further treatment, or, in some cases, directly discharged as effluent. Some of the semi-solid phase, or sludge blanket, is transferred to a bioreactor or aerobic digester, as waste-activated sludge where it is closely monitored, and kept alive in the virtual absence of food by a controlled recycling and aggressive aeration process.

The remainder of the sludge blanket is recycled to the aeration tanks as return-activated sludge where it is mixed with newly introduced untreated wastewater. The combination, called "mixed liquor," undergoes a new cycle of aerobic, microbial metabolic treatment. As a result of the controlled recycling of hungry aggressive digester sludge into the biomass that has been recharged with fresh food-containing wastes, the excess solids normally generated in conventional BAS processes is maintained at or near zero.

In the process of this invention, the waste-activated sludge is closely monitored, and kept under more active aeration than in conventional BAS processes. The modified wastewater treatment system of this invention is a semi-continuous flow system—as opposed to the completely continuous flow of most conventional treatment systems. The manner in which batch recycle-loops are used in this new process controls the biomass differently, and more effectively, than conventional BAS processes. This difference results in a substantial reduction of the uncontrolled buildup of solids under aeration, virtually eliminating the need for mechanical removal of solids from the system to maintain equilibrium. The method of this invention results in the consumption of almost all of the available food and assures that the biomass consumes almost all of its own dead/dying members as part of that food—the ultimate cause of the excess solids growth problem in the first place.

BRIEF DESCRIPTION OF THE DRAWINGS

Other objects, features and advantages of the present invention will become apparent from the following detailed description taken in conjunction with the drawing in which.

DETAILED DESCRIPTION OF THE INVENTION

Figure 1:
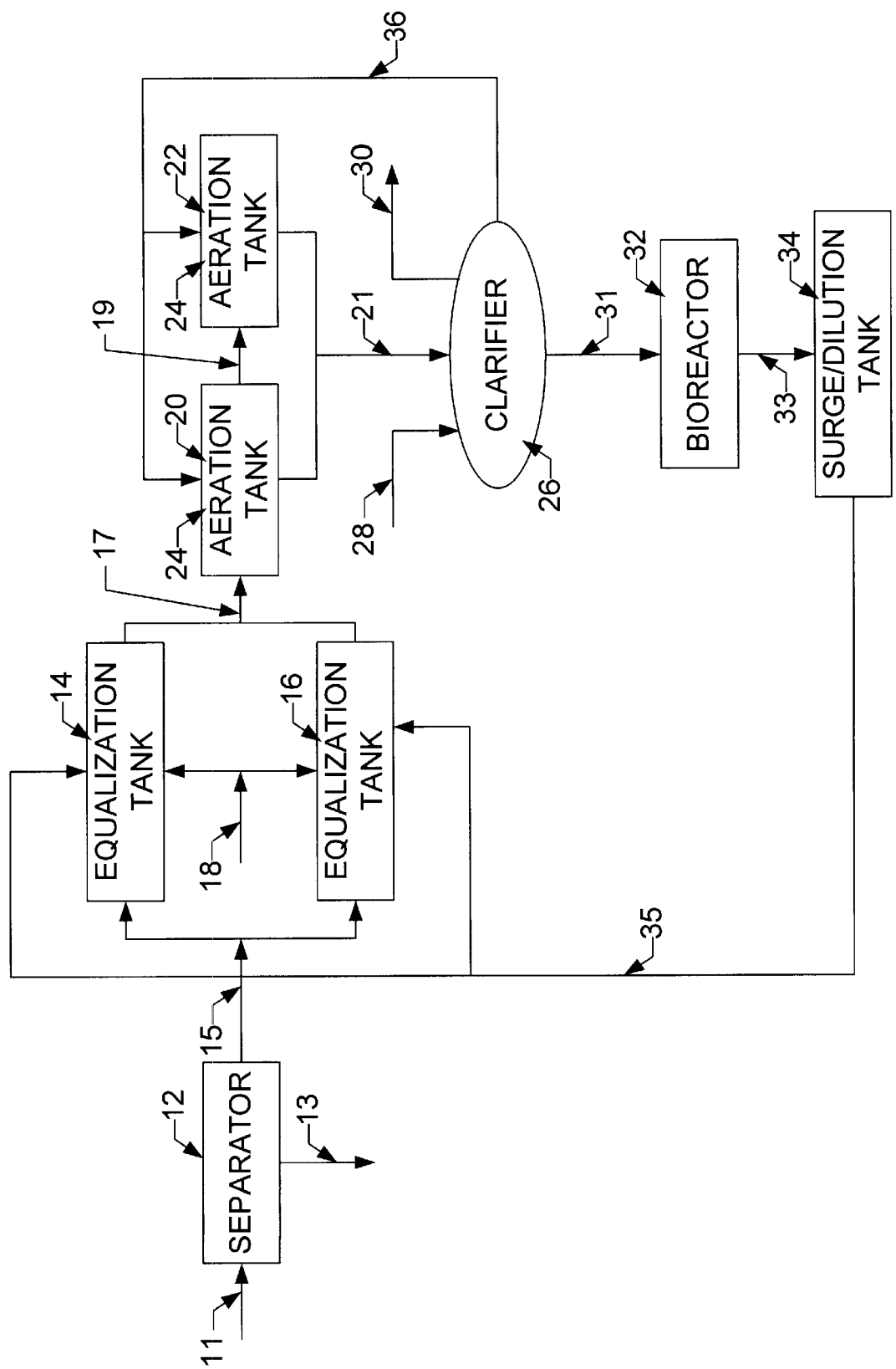
FIG. 1 is schematic representation of the process of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Turning now to FIG. 1 there is shown a schematic drawing of the industrial wastewater treatment process of this invention. FIG. 1 shows a wastewater system that, as a whole, is a semi-continuous flow process having an equalization step, an aeration step, a clarifying step, a digester step and also has added a batch recycle loop for recycling waste-activated sludge (WAS) from the digester step to the equalization step and a loop for recycling return-activated sludge to the equalization step. This invention also includes a control process where waste-activated sludge in the bioreactor is more closely monitored and kept under more aeration than conventional BAS processes and uses batch recycling loops in a conventional BAS process.

Wastewater from an industrial plant flows through a bar screen (not shown) at the oil-water separator 12 where large objects are screened out. The screened wastewater passes through a line 11 through the separator 12 where insoluble materials, e.g., fats, oils and greases are separated at the surface and sand, grit, and dirt settle to the bottom. A floating weir allows for the easy mechanical removal of insolubles from the system by channeling them to external storage tanks 13. The relatively small amount of solids that accumulate on the bottom is mechanically removed on an as needed basis. By removing undesirable fats, oils and greases and harmful grit before they can reach the pretreatment plant, the downstream processes are protected from mechanical harm and the difficult task of treating significant quantities of insolubles.

The wastewater undergoes an equalization step in equalization tanks 14, 16 where hydraulic surges are smoothed, e.g., the flow is reduced to a flow of 2 feet per second or less. Alternatively, the hydraulic surges may be smoothed before the wastewater enters the equalization tank. The wastewater flows by from the separator 12 across a pipe bridge and is introduced into the headworks of the treatment plant via a line 15. The influent pH is highly variable, but almost always is in the acid range, i.e., pH 7 s.u. or less, typically 3.5 to 5.5 s.u. During the equalization step, the pH of the wastewater is continuously monitored and automatically adjusted at 18 with a caustic material such as 25% or 50% caustic soda solution to stabilize the pH between about 6.8 and about 7.2 s.u. The pH adjustment is critical because the microorganisms in the biomass are very sensitive to pH conditions and can be shocked, injured or even destroyed by extremely low or high pH conditions. The equalization tanks 14, 16 are preferably operated in parallel.

The COD value of the wastewater is analyzed at various points in the processes, e.g., to determine initial loading, intermediate step efficiencies, and final or overall removal efficiency. These values are used to monitor and control the entire process. For example, in a typical industrial operation, the wastewater influent strength can vary from 1% (10,000 mg/l) to about 4% (40,000 mg/l), with an average of 2.25% (22,500 mg/l) solids expressed as COD.

Wastewater leaving the equalization tanks contains dissolved solids, or process wastes, as untreated suspended solids in the form of biodegradable organic material. The wastewater is passed through line 17 to one of two aerobic biological oxidation tanks 20, 22 where it is treated under aerobic conditions in the presence of return-activated sludge RAS. After treatment by microorganisms in the biomass (to which RAS is added) in the first aeration tank 20, wastewater is pumped to the second aeration tank 22 for additional microbiological treatment. In both of the aeration tanks 20, 22, organic wastes are absorbed and/or biodegraded by the microorganisms in the biomass (bacteria, protozoans, enzymes, and small multicellular animals like rotifers). These cellular metabolic reactions produce additional suspended solids as most of the COD (available food sources) is fixed then converted into spent (that is, dead and/or dying) biomass. In simplest terms, the suspended organic materials in raw wastewater, sometimes referred to as "food," are mixed in the aeration tanks with RAS, in the presence of sufficient dissolved oxygen, where they are degraded and then consumed by the biomass. Aeration tanks 20, 22 are operated in sequence connected by line 19 having sidewall gate valves (not shown).

The term "aerobic" describes all living organisms that require the presence of free oxygen to respire, metabolize reproduce and thrive. Proper aerobic conditions, in the aeration tanks are achieved using well-known process equipment, primarily compressed air diffuser systems and the like. Preferred aerobic conditions are those wherein the dissolved oxygen (CO) is greater than one mg/liter.

A small amount of fresh proprietary enzymes are added each day to the aeration tanks via line 24 where they have a biological catalyst effect. The preferred enzymes are MB-4, and MB-40 available from Maryland Biochemical Company, Inc. of Bel Air, Md. Other suitable enzymes are known to those skilled in the art. The daily introduction of small quantities of a foreign strain of microorganisms is an important part of the process. These new "bugs" act almost like a catalyst in a chemical reaction. The amount of enzyme added will vary depending upon the type and amount of waste organic matter in the influent wastewater. Most microorganisms live for only hours or, rarely, a day or two, before dividing or dying. In the completed biological wastewater treatment process described here, the process could be compared to a series of analog (sine) waves of dissolved oxygen uptake moving through an aqueous medium of dissolved organic wastes (food). Depending on hydraulic loading and the relative strength of the influent, expressed as COD, this process takes from 3–10 days; probably 4–5 days would represent a typical cycle.

After the aeration step, the wastewater is passed through line 21 to a clarifier 26 where the wastewater is allowed to separate into a liquid or clear phase and a semi-solid sludge phase. The finished clear water flows over the top of the clarifier weir, through line 30 is measured, and then sent to further treatment in a municipality treatment plant or the like. The finished clear water should have the following characteristics or better:

Flow<75,000 gallons per day (0.075 mgd)
pH=not less than 6.0 nor greater than 8.5.
BOD=500 mg/l (313 lbs./day)
TSS=300 mg/l (188 lbs./day)
Hydrocarbon/Oil/Grease=100 mg/l (62.55 lbs./day)

The semi-solid sludge settles to the bottom of the clarifier 26. To facilitate the settlement of the semi-solid sludge, a small amount of polymer or combination of polymers may be added through line 28 into the clarifier to flocculate the sludge. The polymers that may be used include synthetic polymers such as polyacrylamides, polyamides and polydadmac. Natural polymers, such as polysaccharides may also be used. One such preferred polymer is the synthetic petroleum based, anionic polymer Calgon Pol-E-Z 6500. The amount of polymer added will vary depending on the amount of coagulated and suspended solids present or floc size desired. However, the amount of polymer added is preferably about 1 to about 50 parts per million of wastewater.

While the finished wastewater is being discharged through line 30, a portion of the settled semi-solid sludge from the bottom of the clarifier is periodically wasted, i.e., passes through a line 31 into aerobic bioreactor 32. In the aerobic bioreactor (digester), the waste-activated sludge (WAS) is closely monitored and well aerated. A small, carefully-controlled batch of WAS is regularly passed from the bioreactor through a line 33 to the surge/dilution tank 34 where it is diluted under aeration in the absence of food. The WAS is held in the surge/dilution tank until it is needed. Then a batch of diluted WAS is transferred through a line 35 to the equalization tank (14 or 16) which is discharging to the aeration step.

The remainder of the semi-solid sludge from the bottom of the clarifier is continuously recycled through line 36 to the first aeration tank 20 as return-activated sludge (RAS). This recycling step is a normal part of the conventional BAS process. However, in the process of this invention RAS is mixed not only with newly introduced, raw untreated wastewater from the equalization step, but also with the batch of diluted WAS that has been added to the wastewater from the equalization step. The material in the aeration tank comprising; equalized wastewater rich in dissolved solids, recycleactivated sludge from the clarifier, waste-activated sludge and enzymes is sometimes referred to as mixed liquor.

As a result of both batch recycling of WAS, and continuous recycling of RAS, the now stimulated biomass under aeration (which also contains the organic dissolved solids as food), consumes most of the available food much more effectively. In addition, the stimulated biomass consumes much of the excess solid waste generated by this new round of bioactivity. Therefore, excess solids are substantially reduced, or virtually eliminated.

New cycles of biological wastewater treatment occur. The surviving members of the biomass from the clarifier semi-solids sludge, whether recycled as RAS or WAS, are once again exposed to food. There is little or no food in either the bioreactor 32, or in the surge/holding tank 34. The biomass under aeration is now exposed to an invasion of super-hungry microorganisms from both the RAS and the WAS—their surviving parents, grandparents, great-grandparents, etc.—which are competing aggressively with them for the available food. Some portion of the excess solids continues to be recycled either as a part of the RAS or as a part of the WAS, and so receive rounds of additional biotreatment, i.e., the carousel effect. Solids (the organic wastes) within the system are placed on a recycling biotreatment carousel until almost all of them are completely digested; that is, turned in to $H_2O$, $CO_2$, and inert ash.

By controlling both the conventional, continuous RAS recycling process, and the new, improved WAS batch recycling process, the stimulated biomass consumes so much of the available food that the finished water discharged as effluent from the clarifier is so clean that it easily meets permit limits for solids and BOD. In addition, by manipulating F/M ratios and detention time (MCRT), a certain percentage of the biomass can be manipulated to go cannibalistic, i.e., they will eat most of the dead/dying members of the biomass so that the MLSS (suspended solids in mixed liquor) does not increase. Mechanical solids removal is no longer required using this process because a substantial proportion of the biomass consumes all the available food and most of the wastes, so that it is going to completion. Solids do not increase uncontrollably and mechanical removal of excess solids is unnecessary.

The method of this invention uses better measurement of and control over the behavioral characteristics of the biomass as they can be indirectly observed.

EXAMPLE

This example illustrates the operation of a surfactant manufacturing facility that treats approximately 35,000 gallons per day of process wastes before discharging a clean finished effluent. Influent flows are variable and can be highly weather dependent. Even though the average influent flow of process wastes is 35,000 gallons per day, the range of influent flow can be between 6,000–150,000+ gallons per day. Hydraulic loading is always the most challenging problem for wastewater pretreatment plants because rain and snow events are unpredictable and uncontrollable.

The system of this example included a large circular tank with 6 nominal 110,000-gallon capacity pie-shaped cells. In addition, there was a nominal 35,000-gallon capacity top center mounted secondary clarifier. Every wastewater treatment plant has a finite upper limit to its hydraulic loading; this plant had a nominal 700,000-gallon capacity.

Similarly, influent strength was also highly variable with a range of less than 10,000 mg/l (as expressed as COD) to over 40,000 mg/l; the average was approximately 22,500 mg/l. This influent strength was the same as 1–4% solids, with an average of 2.25% solids (as expressed as COD). The normal optimum MLSS operating range for this plant was 6,000–8,000 ppm (expressed as COD). However, if the MLSS's are above that level the batch-recycling loops were started. An optimal MLSS under aeration can be as high as 14,000–16,000 ppm (expressed as COD). The process is self-limiting and MLSS's can not exceed approximately 18,000 ppm no matter what is done in terms of managing the F/M ratio.

Process wastewater from a chemical manufacturing plant entered an upstream 6,000-gallon capacity oil-water separator 12. The influent was screened to remove insoluble, mostly inorganic waste, trash and other larger pieces of untreatable debris. The influent flow rate was measured using a Parshall flume. Before the screened wastewater was introduced into the wastewater treatment plant proper the flow was slowed to about 2 fps.

In this example, wastewater underwent an equalization step in one of two 105,000-gallon capacity equalization tanks. Each equalization tank 14, 16 handled roughly three days of average influent loading. Then for another three days the wastewater was unloaded to the aeration tanks 20, 22. This pattern was followed when the aeration tanks were operated in parallel. The wastewater pH was continuously monitored and adjusted to maintain near neutral conditions; that is, pH values in the range of 6.8–7.2 s.u.'s. The pH adjustment avoided shocking the biomass in the next step.

The equalization tank that was discharging to the aeration tanks, was the first component of the batch-recycling loop process. That is, a small portion of the semi-solid sludge from the clarifier 26 was pumped to the bioreactor 32. In the bioreactor many surviving members of the biomass were kept alive by active aeration in the almost total absence of food (COD). Next, 3,000 to 5,000 gallons of this enriched digester seed sludge was transferred to the third 110,000-gallon capacity tank (surge/dilution tank 34), which functioned as either a staging tank for the batch recycling loop process or as a surge flow buffer basin. Another batch of 3,000 to 5,000 gallons of this staged enriched digester seed sludge was fed from the staging tank into the equalization tank discharging to the aeration tanks. Bioactivity was initiated here, not in the aeration tanks.

The equalized, nutrient rich wastewater entered a series of two 110,000-gallon capacity aeration tanks 20, 22. The aeration tanks were always full of liquid and always operated in series. It is in these tanks that the normal BAS process breakdown and digestion functions occurred—assimilating or metabolizing the food in the process wastewater. Return-activated sludge (RAS) from the clarifier 26 was added just like in a conventional BAS process. This conventional mixed liquor was enriched two separate ways in this example. First, waste-activated sludge (WAS) was added from the discharging equalization tank. Then a small amount of proprietary freeze-dried enzymes was added.

In the process of this invention, the batch-recycling loop provided a process in which the nominal sixteen tons of living biomass suspended in the two 110,000 gallon capacity aeration tanks, operated almost like a single large organism would. It would not be expected that the daily introduction of a small amount of enzymes in tanks of this size would have much effect. However, the opposite was found to be true. That is, the enzymes had a measurable effect. If this step is omitted the entire biological system does not perform nearly as well.

The mixture of materials making up the mixed liquor suspended solids under aeration comprised: (1) equalized wastewater rich in dissolved solids, (2) RAS from the clarifier, (3) WAS from the clarifier to the bioreactor recycled via the surge/holding tank, and (4) enzymes.

All these components affect the microbial action of the biomass such that by manipulation of the food/biomass ratio under aeration the consumption of dissolved solids, including the dead/dying members of the biomass is controlled. As a result, excess solids were never produced and high-strength mixed liquor suspended solids value under aeration was an indicator of a healthy biomass.

Alternatively, from 3,000–5,000 gallons, of waste-activated digester sludge is pumped to the third 110,000-gallon capacity tank, which is also under active aeration. So each tank in the system not only has some level of bioactivity, but also has active aeration in proportion to the bioactivity occurring within it. This batch-recycling loop process involves all six tanks in the system. The changes in function for all six tanks so that they not only perform their normal functions—equalization 14, 16, aeration 20, 22, surge/holding 34, and bioreactor 32—but also, now those normal functions are supplemented by adding some level of bioactivity to the three tanks that normally have no role in that function 14, 16, 34.

The actual effluent discharge conditions may vary widely, but are always within permit limits. Most of these permit limits are expressed as monthly averages, so any minor excursion can usually be easily corrected by collecting a larger a series of test or daily meter values that fall within limits so that the monthly average is also within permit limits.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A biologically-activated sludge process for treating industrial wastewater containing organic waste and solid waste microorganisms comprising:
   (a) equalizing the wastewater in a stream of industrial wastewater by adjusting the pH of said wastewater to a near neutral pH;
   (b) initiating bioactivity in the wastewater by the addition of bioreactor waste-activated sludge to create a reaction with selected microorganisms in said wastewater which said waste-activated sludge is added;
   (c) forming a mixed liquor comprising the wastewater from step (b), return-activated sludge and fresh enzymes, and aerating said mixed liquor whereby said microorganisms continuously degrade said organic waste while said organic waste is part of said biomass mixture and wherein said reaction produces spent microbial mass;
   (d) separating said mixed liquor into a finished wastewater phase and a semi-solids phase;
   (e) removing said finished wastewater phase from said separating step;
   (f) removing said semi-solids phase from said separating step,
   (g) recycling a portion of said semi-solids as return-activated sludge directly to said mixed liquor, and
   (h) aerobically reacting the remaining portion of said semi-solids phase and recycling the partially digested waste-activated sludge for reuse in said initiating step, whereby said biomass under aeration consumes most of the excess solids waste virtually eliminating said excess solids.

2. The biologically-activated sludge process according to claim 1 wherein the hydraulic load of said wastewater is smoothed during said equalization step.

3. The biologically-activated sludge process according to claim 1 wherein said bioactivity is initiated prior to said equalizing step.

4. The biologically-activated sludge process according to claim 1 wherein said fresh enzymes are added daily to the aeration tank as a biological catalyst.

5. The biologically-activated sludge process according to claim 1 wherein said process is continuous with the addition of a waste-activated sludge batch-recycle loops.

6. The biologically-activated sludge process according to claim 1 wherein the pH in said equalizing step is continually adjusted to a pH between about 6.8 and about 7.2.

7. The biologically-activated sludge process according to claim 1 wherein a polymer is added to the separating step in an amount sufficient to flocculate the solids.

8. The biologically-activated sludge process according to claim 7 wherein said polymer is a synthetic anionic polymer added to said separating step in an amount from 0.1 to 35 parts per million of wastewater.

9. A continuous biologically-activated sludge process for treating industrial wastewater containing organic waste and solid waste comprising:
   (a) equalizing the wastewater in a stream of industrial wastewater by smoothing the hydraulic load of said wastewater and continuously adjusting the pH of said wastewater to a pH between 6.8 and 7.2;
   (b) initiating bioactivity in the wastewater by the addition of bioreactor waste-activated sludge to create a reaction with selected microorganisms in a said wastewater to which said waste-activated sludge is added;
   (c) forming a mixed liquor comprising the wastewater from step (b), return-activated sludge and fresh enzyme, and aerating said mixed liquor whereby said microorganisms continuously degrade said organic waste while said organic waste is part of said biomass mixture and wherein said reaction produces spent microbial mass;
   (d) separating said mixed liquor into a finished wastewater phase and a semi-solids phase;
   (e) removing said finished wastewater phase from said separating step;
   (f) removing said semi-solids phase from said separating step,
   (g) recycling a portion of said semi-solids as return-activated sludge directly to said mixed liquor, and
   (h) aerobically reacting the remaining portion of said semi-solids phase and recycling the partially digested waste-activated sludge for reuse in said initiating step, whereby said biomass under aeration consumes most of the excess solids waste virtually eliminating said excess solids.

10. The biologically-activated sludge process according to claim 9 wherein a synthetic anionic polymer is added to the separating step in an amount from 0.1 to 35 parts per million of wastewater.

* * * * *